June 2, 1970 G. W. FRANCKLYN 3,514,890
FISHING LURE
Filed May 1, 1968
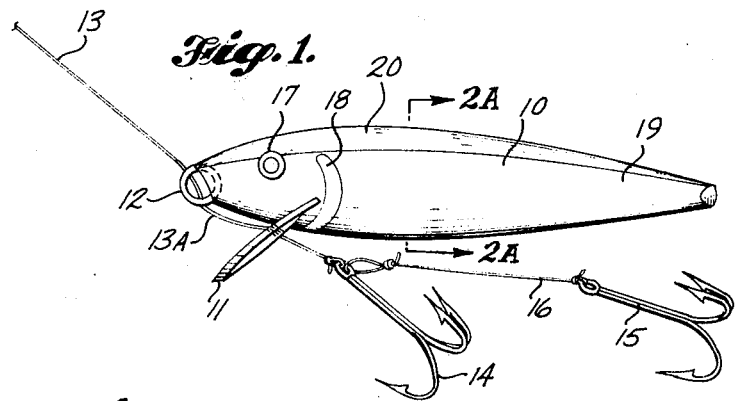
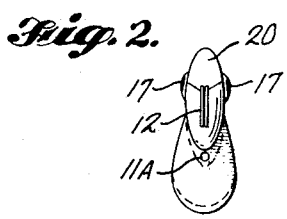
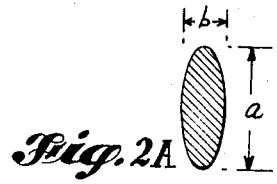
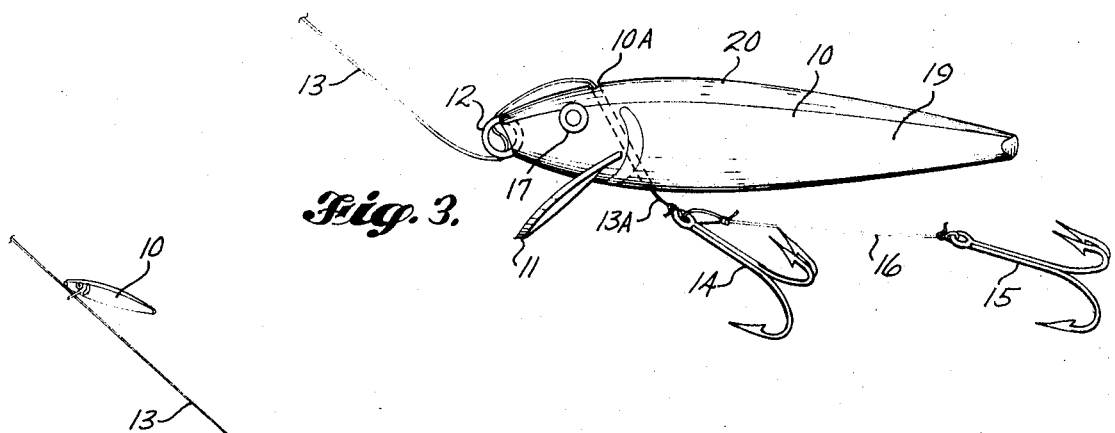
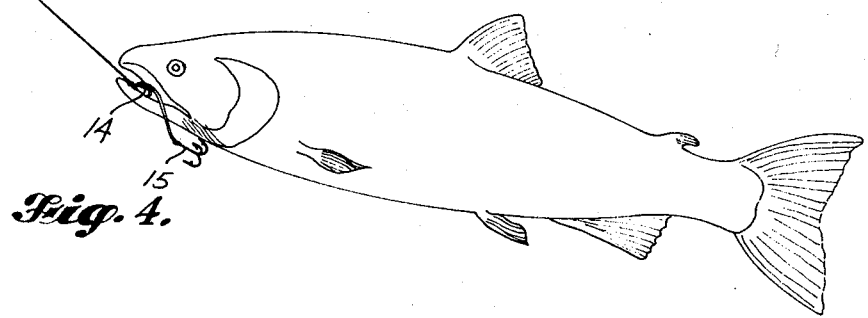
INVENTOR.
GILBERT W. FRANCKLYN
BY *Christensen, Sanborn & Matthews*
ATTORNEYS

United States Patent Office 3,514,890
Patented June 2, 1970

3,514,890
FISHING LURE
Gilbert W. Francklyn, Rte. 4, Box 623,
Poulsbo, Wash. 98370
Filed May 1, 1968, Ser. No. 725,643
Int. Cl. A01k *85/00*
U.S. Cl. 43—42.05     3 Claims

ABSTRACT OF THE DISCLOSURE

A fish lure comprising a body made of floatable material and having as the only external protrusion thereon a bill assembly for causing the lure to dive and dart when pulled through the water. A line-holding clip is provided at the nose of the lure and is adapted to grip the fish line with sufficient force to permit the lure to be pulled through the water. The fish line extends through an opening in the bill or lure body to a point beneath the lure body and has fishhooks attached directly to the line without being attached to the body of the lure. When a fish strikes, the line is pulled free from the nose clip and the lure rides up the fish line.

---

Various types of fishing lures have been devised including those having releasable hook assemblies which are adapted to cause separation of a fish lure body from the hooks when a fish strikes. In this manner the lure body is protected against chewing by a fish after he has struck the lure in that the hooks themselves remain engaged in the fish while the lure body is detached from the hook assembly in response to the strike of the fish. However, in most such arrangements added hardware is required for releasably holding the hooks to the body of the lure with the result that the added weight associated with the holding assemblies prevents intricate darting action of the lure. In addition, the overall weight of the lure generally tends to increase as a result of the added hardware.

It is thus an object of the present invention to provide a fishing lure having increased action.

Another object of the present invention is to provide an improved fishing lure having the fishhooks essentially disconnected from the body of the lure at all times.

Another object of the present invention is to provide a simplified fish lure wherein the fish line is releasably attached to the nose of the fish lure and wherein the line then extends from the nose through an opening in the lure to permit relative movement of the lure with respect to the line and hooks once the line is disengaged from the nose line-holding assembly.

An additional object of the present invention is to provide a simplified fishing lure wherein the fishhooks are at no time rigidly attached to the body of the lure and wherein the position of the hooks relative to the lure body is readily adjusted.

The above as well as additional advantages and objects of the invention will be more clearly understood from the following description when read with reference to the accompanying drawings wherein, FIG. 1 is a side view of the preferred embodiment of the fishing lure of the present invention.

FIG. 2 is a front view of the lure of FIG. 1.

FIG. 2A is a cross-sectional view at the approximate midsection of the lure of FIG. 1 and along the lines 2A—2A of FIG. 1.

FIG. 3 is an alternate embodiment of the invention showing a different manner of extending the fish line to the lower portion of the lure for attachment of the hooks.

FIG. 4 is an illustration of a fish caught on the hooks and showing the lure as having moved up the fish line and away from the fish.

Turning now to the drawings, it will be seen in FIG. 1 that the improved fishing lure includes a main body section 10 of material which is lighter than water. It has been found in practice that cedar wood works well for manufacture of the body, but of course suitable plastic materials having the desired buoyancy characteristics can be used. As seen in FIG. 2A the cross section of the lure at the approximate midpoint is generally elliptical with the vertical dimension $a$ being approximately three times the horizontal dimension $b$. It has been found that this ratio results in a lure having greatly increased action over other lures having more circular cross sections.

As seen in FIG. 1 the lure has a downwardly and forwardly extending scoop or bill assembly 11 such as is common in the art for causing the lure to dip and dive when pulled through the water. The bill 11 can be made of any suitable plastic material, although it has been found to be most advantageous to have the bill 11 made from a deformable metal so that the angle thereof can be readily adjusted by the fisherman for adjusting the action of the lure. The lure also has a metal line-holding nose clip 12 which in the illustrated embodiment is a circular ring assembly made of brass and readily available on the market. The line clip 12 is embedded in the nose of the lure body in the manner shown so that the streamlined contours of the lure is maintained by the curvature of the clip. The nose clip is adapted to hold the fishing line 13 in a secure manner.

A section of the line 13A extends downwardly and rearwardly from the nose clip 12 through a hole 11A in the diving bill 11 to a point beneath the body of the lure. A first treble hook assembly 14 is shown as being attached directly to the end of the line 13 with a second set of treble hooks 15 being secured by a short piece of line 16 to the eye of the hook 14 or to the line 13A.

The arrangement is such that the body of the lure 10 is able to move relatively independently from the hooks and thereby is able to undergo increased action since the mass of the hooks need not follow the intricate short flips of the lure as it is pulled through the water. The body of the lure is preferably provided with an eye 17, and suitable coloring to simulate the appearance of a bait fish of the type typically serving as a main food for the fish being sought. In the specific example, the line is adapted primarily for salmon fishing and simulates a herring by having a gill stripe 18, a silver body 19, and a green top 20.

With the assembly as illustrated in FIG. 1, the action illustrated in FIG. 4 results when a fish strikes the lure. As seen in FIG. 4, the fish becomes caught on the hooks with the pressure exerted by the fish causing the line 13 to snap out of the line-holding clip 12 to thereby permit the lure 10 to float up the line and away from the fish. Thus the teeth of the fish do not injure the body of the lure. It is also to be seen that if the lure becomes snagged on an object in the water the force exerted by the fisherman will cause the lure body to separate from the hooks and ride up the line to the surface of the water where it can be retrieved by the fisherman. The only loss to the fisherman would then be his hooks and not the more expensive lure body. Note also that due to the simple manner of holding the hooks to the lure body (i.e., by the quick-release noise clip) the position of the hooks is readily adjusted according to the desires of the fisherman. Also, resetting the hooks after catching a fish is done with such ease that the fisherman can accomplish the same even though his hands are cold.

While the embodiment of FIG. 1 is found to be preferable, I have discovered that the arrangement of FIG. 3 provides increased advantages over other lures available on the market. As seen in FIG. 3, the line passes from the nose clip 12 upwardly and over the eye 17 and is then directed downwardly through a channel or hole 10A cut at an oblique angle through the body of the lure so that the section of line 13A exits beneath the body of the fish for attachment of the treble hooks in the manner of FIG. 1. It will be seen that when a fish strikes, the lure body rides up the line in a manner similar to that shown in FIG. 4.

There has thus been disclosed an improved fishing lure which provides increased lure action due to the manner of separation of the hooks from the body during normal operation. Recovery of the lure body is also enhanced in the event of snagging of the hooks due to the release action which takes place when a force is exerted on the hooks. While the invention has been disclosed by reference to presently preferred embodiments it will be evident to those skilled in this art that changes and modifications can be made without departing from the inventive concepts.

What is claimed is:

1. A fishing lure assembly comprising in combination: a lure body in the shape of a bait fish having a nose clip located at the most forward point of the body for releasably holding a fish line when a predetermined force is exerted thereon, said lure being provided with means providing a single opening for the passage of a portion of the fish line from the line-engaging nose clip to a point beneath the lower portion of the lure for direct attachment of fishing hooks to the end of the fishing line, passing through said opening so that the hooks are located to the rear of said opening when the lure is pulled through the water, whereby the fishing hooks are substantially independent from the lure body and a portion of the fishing line is encompassed by a portion of the fishing lure so that the lure will ride up the line when the hooks are engaged with a fish or other object and force is exerted on the line.

2. The apparatus of claim 1 including a bill assembly extending downwardly and forwardly from the body for causing the lure to dive and move in an erratic pattern when the lure is pulled through the water and wherein said opening is provided in said bill.

3. The apparatus of claim 2 including a piece of line extending from said clip through said opening with the end thereof hanging free beneath said body, and at least one hook secured to the said end of the line.

References Cited

UNITED STATES PATENTS

| | | | |
|---|---|---|---|
| 2,236,353 | 3/1941 | Minser | 43—42.05 |
| 2,572,616 | 10/1951 | Hansen | 43—42.05 |
| 2,793,459 | 5/1957 | Multanen | 43—42.04 |

FOREIGN PATENTS 82,696   2/1964   France.
(Addtion to No. 1,320,883)

SAMUEL KOREN, Primary Examiner

DANIEL J. LEACH, Assistant Examiner